United States Patent
Gill

(10) Patent No.: US 7,283,336 B2
(45) Date of Patent: Oct. 16, 2007

(54) METHOD AND APPARATUS FOR PROVIDING A CURRENT-IN-PLANE (CIP) GMR SENSOR WITH AN IMPROVED IN-STACK BIAS LAYER WITH A THINNER SENSOR STACK

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 422 days.

(21) Appl. No.: 10/811,524

(22) Filed: Mar. 29, 2004

(65) Prior Publication Data

US 2005/0213263 A1 Sep. 29, 2005

(51) Int. Cl.
G11B 5/39 (2006.01)

(52) U.S. Cl. ................................. 360/324.12
(58) Field of Classification Search ............ 360/324.12
See application file for complete search history.

(56) References Cited

U.S. PATENT DOCUMENTS

| | | | |
|---|---|---|---|
| 6,023,395 A | 2/2000 | Dill et al. | |
| 6,266,218 B1 | 7/2001 | Carey et al. | |
| 6,473,279 B2 * | 10/2002 | Smith et al. | 360/324.12 |
| 6,515,838 B1 | 2/2003 | Gill | |
| 6,643,105 B2 | 11/2003 | Nakamoto et al. | |
| 6,671,139 B2 * | 12/2003 | Carey et al. | 360/324.12 |
| 6,867,953 B2 * | 3/2005 | Gill | 360/324.12 |
| 6,985,338 B2 * | 1/2006 | Gill | 360/324.12 |
| 2002/0085323 A1 * | 7/2002 | Smith et al. | 360/324.12 |
| 2003/0179513 A1 * | 9/2003 | Pinarbasi | 360/324.11 |
| 2003/0179514 A1 | 9/2003 | Pinarbasi | |
| 2003/0206382 A1 * | 11/2003 | Carey et al. | 360/324.12 |
| 2003/0227721 A1 | 12/2003 | Gill | |
| 2005/0013061 A1 * | 1/2005 | Gill | 360/324.11 |
| 2005/0036244 A1 * | 2/2005 | Carey et al. | 360/324.12 |
| 2006/0196039 A1 * | 9/2006 | Sakai et al. | 29/603.08 |
| 2006/0221515 A1 * | 10/2006 | Carey et al. | 360/324.12 |
| 2007/0019340 A1 * | 1/2007 | Gill | 360/324.11 |

* cited by examiner

Primary Examiner—Jefferson Evans
(74) Attorney, Agent, or Firm—David W. Lynch; Chambliss Bahner & Stophel

(57) ABSTRACT

A method and apparatus for providing a current-in-plane (CIP) GMR sensor with an improved in-stack bias layer with a thinner sensor stack is disclosed. Improved pinning of a free-layer in a CIP GMR sensor stack is provided using dual in-stack biasing layers. The sensor stack is made thin because an anti-ferromagnetic layer is not necessary to bias the free-layer.

19 Claims, 5 Drawing Sheets

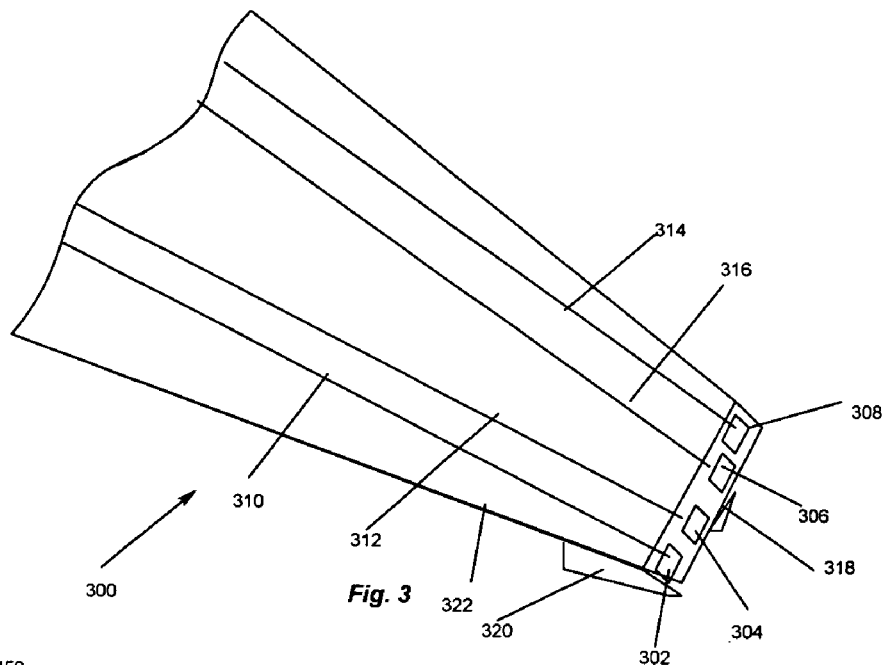
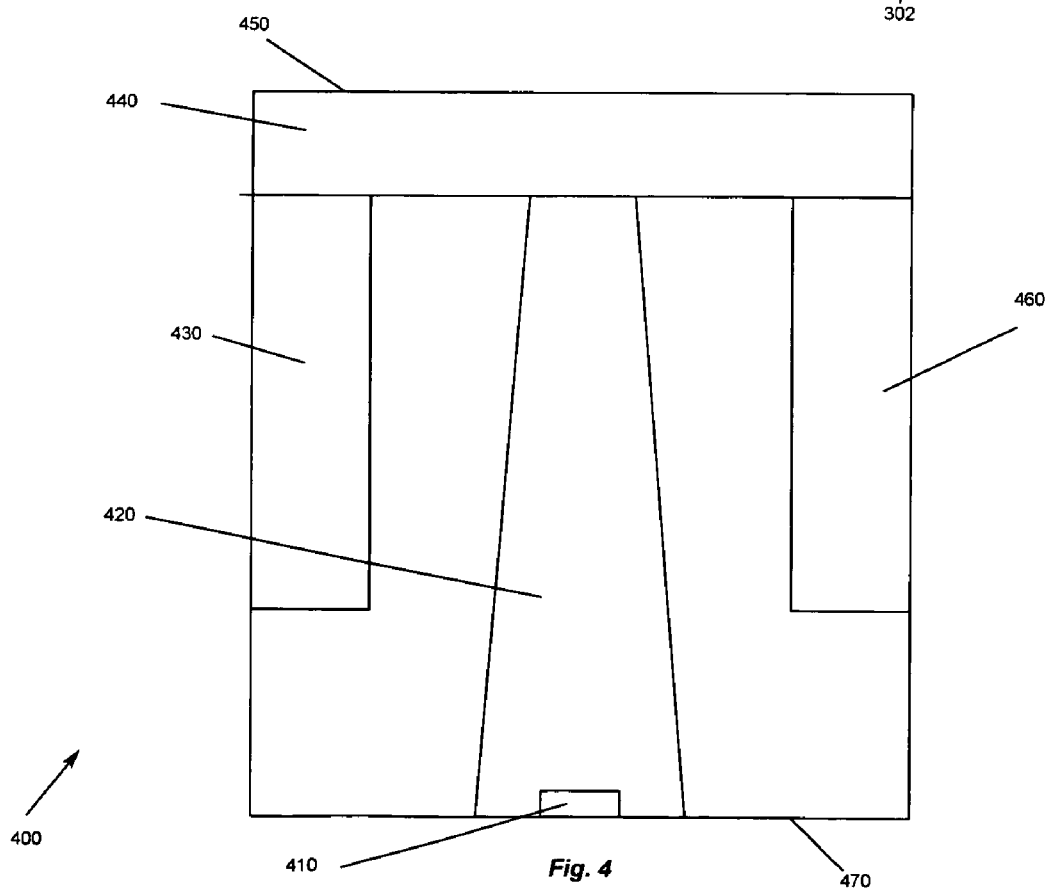

METHOD AND APPARATUS FOR PROVIDING A CURRENT-IN-PLANE (CIP) GMR SENSOR WITH AN IMPROVED IN-STACK BIAS LAYER WITH A THINNER SENSOR STACK

BACKGROUND OF THE INVENTION

1. Field of the Invention.

This invention relates in general to magnetic sensors, and more particularly to a method and apparatus for providing a current-in-plane (CIP) GMR sensor with an improved in-stack bias layer with a thinner sensor stack.

2. Description of Related Art.

Magnetic recording is a key segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was used for data storage. Areal density continues to grow due to improvements in magnetic recording heads, media, drive electronics, and mechanics.

Magnetic recording heads have been considered the most significant factor in areal-density growth. The ability of the magnetic recording heads to both write and subsequently read magnetically recorded data from the medium at data densities well into the gigabits per square inch (Gbits/in$^2$) range gives hard disk drives the power to remain the dominant storage device for many years to come.

Important components of computing platforms are mass storage devices including magnetic disk and magnetic tape drives, where magnetic tape drives are popular, for example, in data backup applications. Write and read heads are employed for writing magnetic data to and reading magnetic data from the recording medium. The read and write heads are connected to processing circuitry that operates according to a computer program to implement the writing and reading functions.

A magnetoresistive (MR) sensor changes resistance in the presence of a magnetic field. Recorded data can be read from a recorded magnetic medium, such as a magnetic disk, because the magnetic field from the recorded magnetic medium causes a change in the direction of magnetization in the read element, which causes a corresponding change in the sensor resistance.

A magnetoresistive (MR) sensor detects magnetic field signals through the resistance changes of a sensing element as a function of the strength and direction of magnetic flux being sensed by the sensing element. Conventional MR sensors, such as those used as MR read heads for reading data in magnetic recording disk and tape drives, operate on the basis of the anisotropic magnetoresistive (AMR) effect of the bulk magnetic material, which is typically permalloy. A component of the read element resistance varies as the square of the cosine of the angle between the magnetization direction in the read element and the direction of sense current through the read element. Recorded data can be read from a magnetic medium, such as the magnetic disk in a magnetic disk drive, because the external magnetic field from the recorded magnetic medium (the signal field) causes a change in the direction of magnetization in the read element, which in turn causes a change in resistance of the read element. This change in resistance may be used to detect magnetic transitions recorded on the recording media.

In the past several years, prospects of increased storage capacity have been made possible by the discovery and development of sensors based on the giant magnetoresistance (GMR) effect, also known as the spin valve effect. In a spin valve sensor, the GMR effect varies as the cosine of the angle between the magnetization of the pinned layer and the magnetization of the free-layer. Magnetic sensors utilizing the GMR effect are found in mass storage devices such as, for example, magnetic disk and tape drives and are frequently referred to as spin valve sensors. In operation, a sense current is caused to flow through the read head and therefore through the sensor. The magnetic flux from the disc causes a rotation of the magnetization vector in at least one of the sheets, which in turn causes a change in the overall resistance of the sensor. As the resistance of the sensor changes, the voltage across the sensor changes, thereby producing an output voltage.

The output voltage produced by the sensor is affected by various characteristics of the sensor. The sense current can flow through the sensor in a direction that is parallel to the planes of the layers or stacked strips. This is known as a current-in-plane (CIP) configuration.

Alternatively, the sense current can flow through the sensor in a direction that is perpendicular to the planes of the layers or stacked strips that comprise the sensor. This configuration is known as a current-perpendicular-to-plane (CPP) configuration.

One of the problems with such a MR read head, however, lies in developing a structure that generates an output signal that is both stable and linear with the magnetic field strength from the recorded medium. If some means is not used to stabilize the sensing ferromagnetic layer, i.e., to maintain it in a single magnetic domain state, the domain walls of magnetic domains will shift positions within the sensing ferromagnetic layer, causing noise that reduces the signal-to-noise ratio. This may give rise to a non-reproducible response of the head, when a linear response is required. Therefore, the free-layer must be stabilized by longitudinal biasing so that the magnetic spins of the free-layer are in a single domain configuration.

There are two stabilization schemes for biasing of the free-layer. One stabilization scheme is to provide a bias field from the lead regions at the side edges of the read sensor. The most common technique includes the fabrication of a bias layer for providing tail stabilization at the physical track edges of the sensor. The efficacy of the method of stabilization depends critically on the precise details of the tail stabilization, which is difficult to accurately control.

The other stabilization scheme is to provide an in-stack longitudinal bias structure including a soft ferromagnetic bias layer and an anti-ferromagnetic (AFM) bias layer. However, as the thickness of the AFM layer is reduced, the exchange bias also decreases. One method to construct thinner sensors is to provide biasing without an anti-ferromagnetic layer using in-stack biasing. However, the sense current in a current-in-plane (CIP) GMR sensor may be shunted by the bias stack thereby degrading the ability of the sensor to detect recorded signals.

It can be seen that there is a need for a method and apparatus for providing a current-in-plane (CIP) GMR sensor with an improved in-stack bias layer with a thinner sensor stack.

SUMMARY OF THE INVENTION

To overcome the limitations described above, and to overcome other limitations that will become apparent upon reading and understanding the present specification, the present invention discloses a method and apparatus for providing a current-in-plane (CIP) GMR sensor with an improved in-stack bias layer with a thinner sensor stack.

The present invention solves the above-described problems by providing improved pinning of a free-layer in a CIP GMR sensor stack using dual in-stack biasing layers. The sensor stack is made thin because an anti-ferromagnetic layer is not necessary to bias the free-layer.

A CIP GMR sensor in accordance with the principles of the present invention includes a GMR sensor stack, a spacer layer formed over a free-layer of the GMR sensor stack and an in-stack biasing layer disposed over the spacer.

In another embodiment of the present invention, a magnetic storage system is provided. The magnetic storage system includes a magnetic storage medium having a plurality of tracks for recording of data and a current-in-plane (CIP) GMR sensor maintained in a closely spaced position relative to the magnetic storage medium during relative motion between the magnetic transducer and the magnetic storage medium, wherein the CIP GMR sensor further includes a GMR sensor stack, a spacer layer formed over a free-layer of the GMR sensor stack and an in-stack biasing layer disposed over the spacer.

In another embodiment of the present invention, a method for providing a current-in-plane (CIP) GMR sensor with an improved in-stack bias layer with a thinner sensor stack is provided. The method includes forming a thin spin valve stack, forming a spacer over the spin valve stack, forming lead layers in a passive region outside the track, forming an in-stack bias layer over the spacer for biasing a free-layer of the spin valve stack and forming a cap over the bias layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a current-in-plane (CIP) GMR sensor with an improved in-stack bias layer with a thinner sensor stack. The present invention provides improved pinning of a free-layer in a GMR sensor stack. The sensor stack is made thin because an anti-ferromagnetic layer is not necessary.

Figure 1:
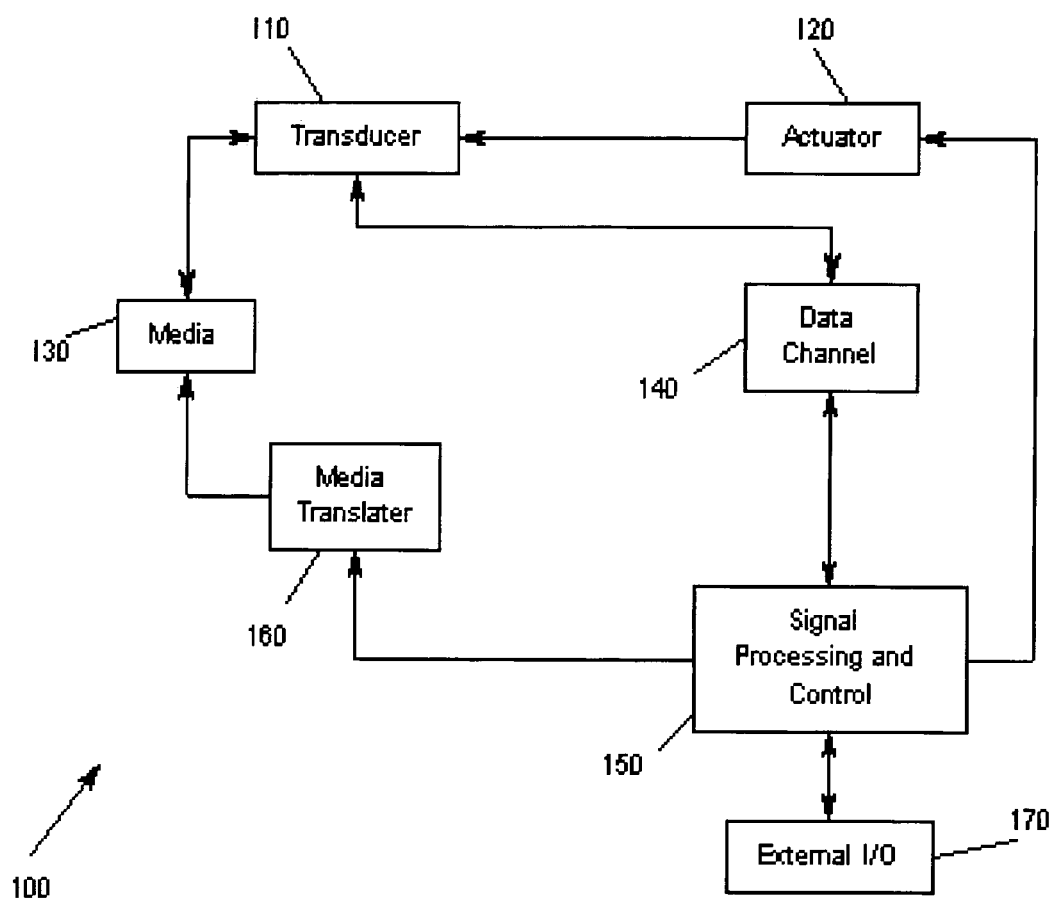
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
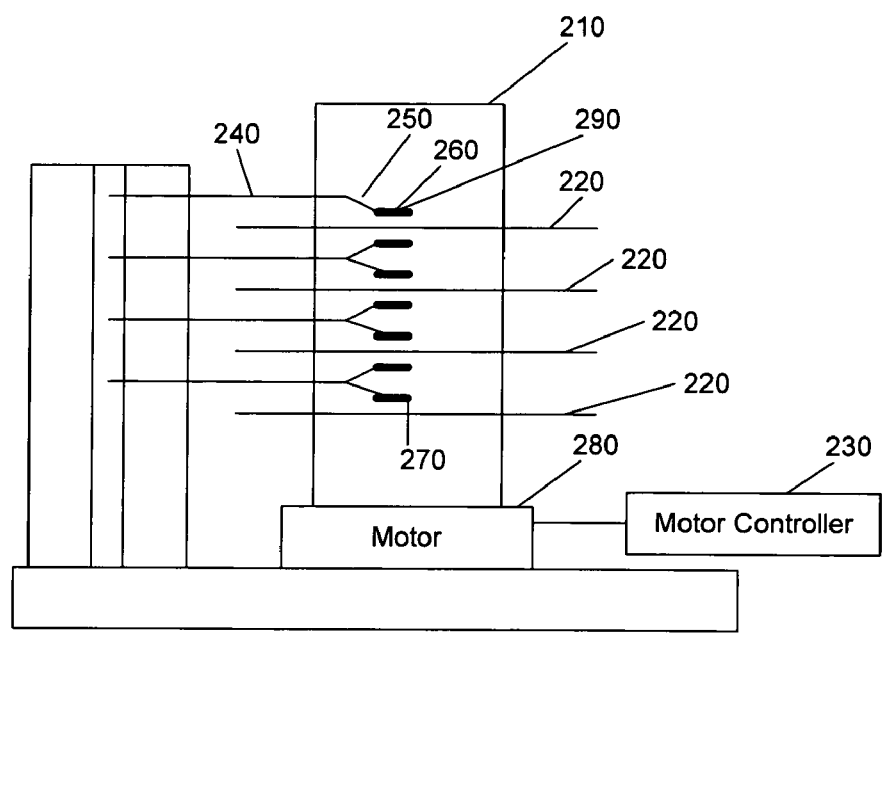
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1-4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
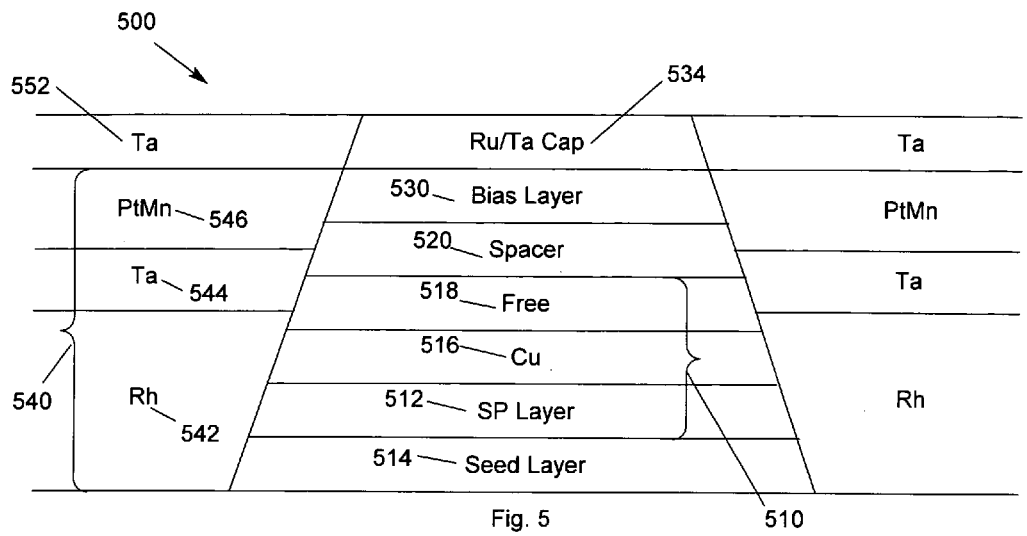
FIG. 5 illustrates a thin sensor stack having an in-stack bias layer for providing improved pinning for a CIP GMR sensor according to an embodiment of the present invention.

FIG. 5 illustrates a thin sensor stack having an in-stack bias layer for providing improved pinning for a CIP GMR sensor 500 according to an embodiment of the present invention. In FIG. 5, the sensor stack 510 includes a self-pinned layer 512 formed over a seed layer 514. A copper interlayer 516 is formed over the self-pinned layer 512 and the free-layer 518 is then formed over the copper interlayer 516. A spacer 520 is formed over the free-layer 518. A bias layer 530 is formed over the spacer 520. The magnetizations of the pinned-layer 512 of the sensor 500 may be self-pinned perpendicular to the air bearing surface using positive magnetostriction and compressive stress. The free-layer 518 of the sensor 500 is stabilized by the in-stack bias layer that includes the bias layer 530. A Ruthenium/Tantalum alloy cap 534 is formed over the bias layer 530.

Lead layers 540 are formed adjacent the track edges. The Rhodium (Rh) metal layers 542 next to the sensor stack 510 function as leads for providing a current-in-plane (CIP) GMR sensor, e.g., in the direction of arrow 550. Lead overlay structures require good electrical contact between the lead material and the sensor 500. In FIG. 5, Tantalum 544 is used over the Rhodium layer. A Platinum-Manganese alloy 546 is formed over the Tantalum layer 544 adjacent the edges of the bias layer 530. A layer of Tantulum 552 is formed over the Platinum-Manganese overlay 546.

Figure 6:
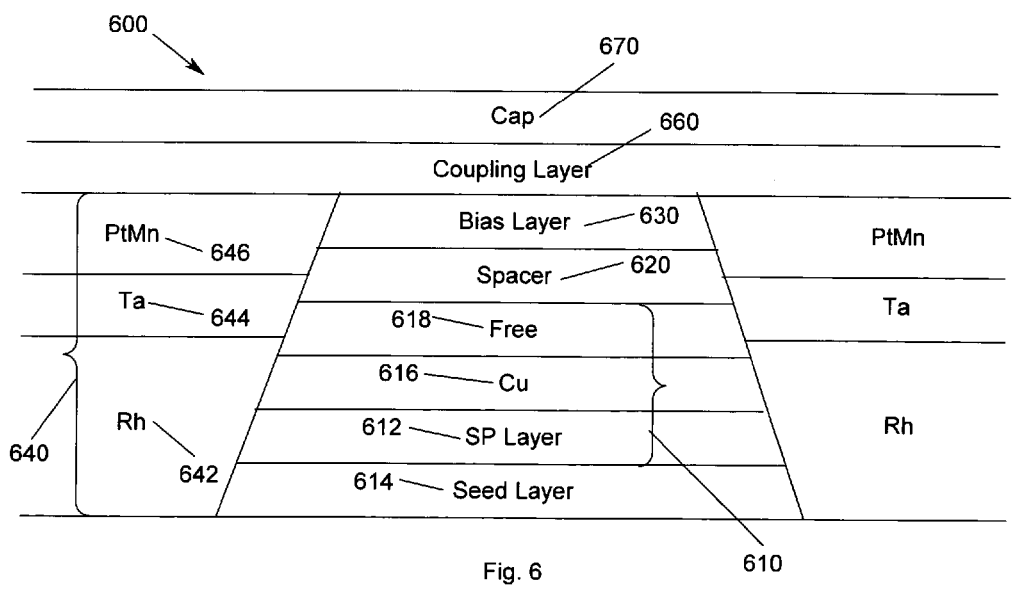
FIG. 6 shows a completed CIP GMR sensor having a thin sensor stack with an first in-stack bias layer for providing improved pinning according to an embodiment of the present invention.

FIG. 6 shows a completed CIP GMR sensor 600 having a thin sensor stack with a first in-stack bias layer for providing improved pinning according to an embodiment of the present invention. In FIG. 6, the sensor stack 610 includes a self-pinned layer 612 formed over a seed layer 614. A copper interlayer 616 is formed over the self-pinned layer 612 and the free-layer 618 is then formed over the copper interlayer 616. A spacer 620 is formed over the free-layer 618. A bias layer 630 is formed over the spacer 620. Lead layers 640 formed adjacent the track edges include Rhodium (Rh) metal layers 642 and Tantalum 644 over the Rhodium layer 642.

In FIG. 6, the Tantalum 552 and the cap 534 are removed using, for example, reactive ion etching. Then, a coupling layer 660 is formed over the bias layer 630. A cap 670 is formed over the coupling layer 660. To provide improved pinning, the first 630 bias layer and the coupling layer 660 are formed using layers of NiFe, CoFe, or other high resistivity allows such as NiFeCr, NiFeX, CoFeX. While the longitudinal bias field provided by the first 630 and second 660 bias layers maximize the linearity of the sensor 600 by maintaining the magnetization in the free-layer 618 and the pinned-layer 612 orthogonally to each other, the resultant magnetization of the free-layer 618 can rotate freely under the influence of a readback field. The coupling layer 660 is exchange pinned by the antiferromagnetic layer (PtMn, 646) in areas outside the track. The intra film exchange coupling in the layer 660 provides pinning to the bias layer 630 in the track area.

Figure 7:
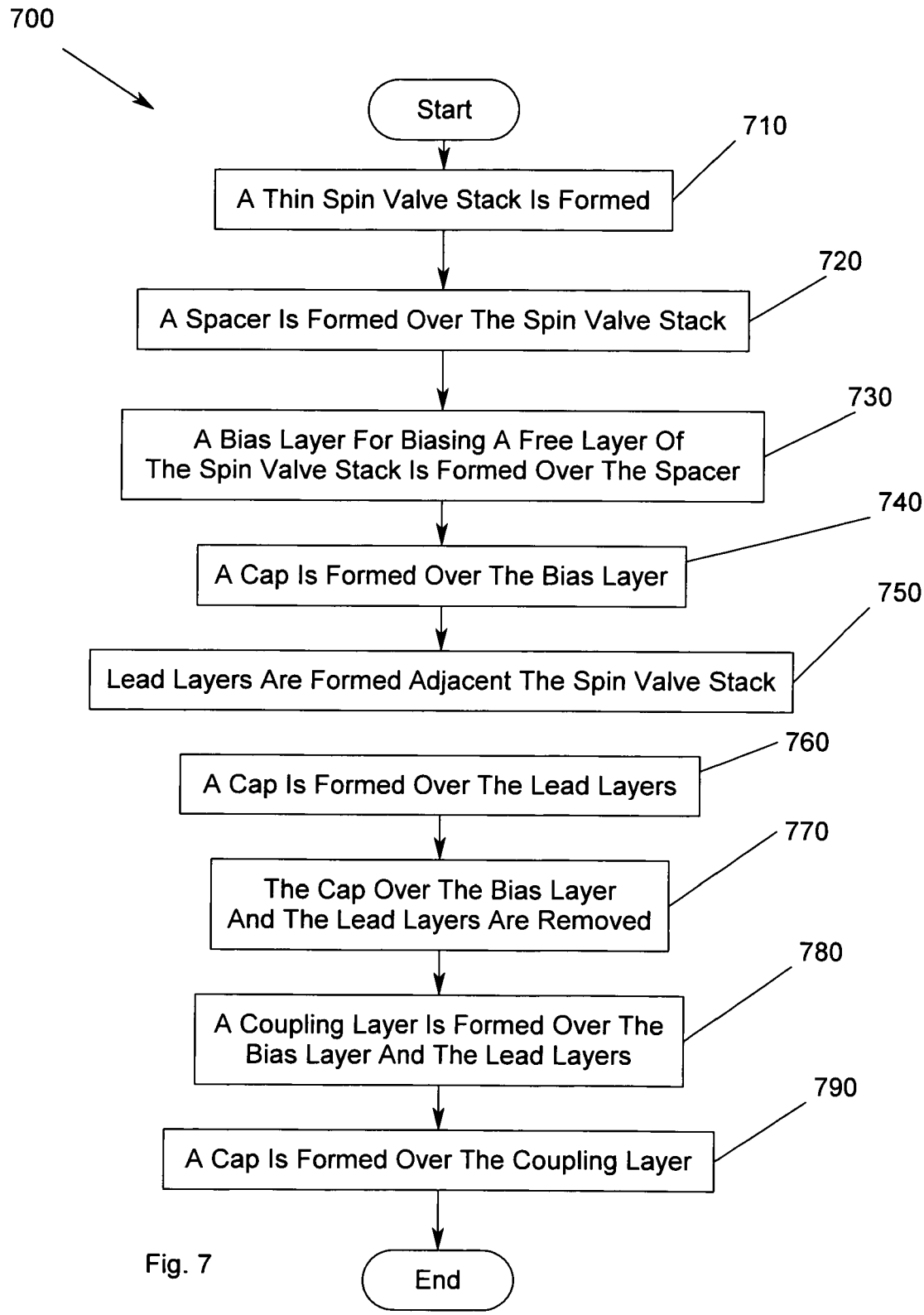
FIG. 7 illustrates a flow chart of a method for providing a current-in-plane (CIP) GMR sensor with an improved in-stack bias layer with a thinner sensor stack.

FIG. 7 illustrates a flow chart of a method for providing a current-in-plane (CIP) GMR sensor with an improved in-stack bias layer with a thinner sensor stack. In FIG. 7, a thin spin valve stack is formed 710. A spacer is formed over the spin valve stack 720. A bias layer for biasing a free-layer of the spin valve stack is formed over the spacer 730. A cap is formed over the bias layer 740. Lead layers are formed adjacent the spin valve stack 750. A cap is formed over the lead layers 760. The cap over the first in-stack bias layer and the cap over the lead layers are removed 770. A coupling layer is formed over the bias layer and the lead layers 780. A cap is formed over the coupling layer 790.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A current-in-plane (CIP) GMR sensor, comprising:
    a GMR sensor stack having a width selected to provide a predetermined track width;
    a spacer layer, having a width substantially equal to the spin valve stack, formed over a free-layer of the GMR sensor stack;
    an in-stack biasing layer disposed over the spacer and having a width substantially equal to the width of the GMR sensor stack; and
    an antiferromagnetic layer formed on both sides of the in-stack biasing layer to provide an off-track bias layer.

2. The CIP GMR sensor of claim 1, wherein the in-stack biasing layer comprises materials selected from the group consisting of NiFe, CoFe, NiFeCr, NiFeX and CoFeX.

3. The CIP GMR sensor of claim 1, further comprising lead layers formed on either side of the GMR sensor stack, wherein the lead layers comprises a layer of Rhodium disposed adjacent to the GMR sensor stack and a Tantalum layer formed over the layer of Rhodium.

4. The CIP GMR sensor of claim 1, wherein the antiferromagnetic layer comprises a layer of Platinum-Manganese.

5. The CIP GMR sensor of claim 1, wherein the in-stack biasing layer comprises a bias layer formed only over the spacer and a coupling layer formed over the bias layer and the antiferromagnetic layer.

6. The CIP GMR sensor of claim 5, wherein the bias layers and coupling layer each comprise a material selected from the group consisting of NiFe, CoFe, NiFeCr, NiFeX and CoFeX.

7. The CIP GMR sensor of claim 1 further comprising a cap layer formed over the in-stack bias layer.

8. A magnetic storage system, comprising:
    a magnetic storage medium having a plurality of tracks for recording of data; and
    a current-in-plane (CIP) GMR sensor maintained in a closely spaced position relative to the magnetic storage medium during relative motion between the magnetic transducer and the magnetic storage medium, the CIP GMR sensor further comprising:
    a GMR sensor stack having a width selected to provide a predetermined track width;

a spacer layer, having a width substantially equal to the spin valve stack, formed over a free-layer of the GMR sensor stack;

an in-stack biasing layer disposed over the spacer and having a width substantially equal to the width of the GMR sensor stack; and an antiferromagnetic layer formed on both sides of the in-stack biasing layer to provide an off-track bias layer.

9. The magnetic storage of claim 8, wherein the in-stack biasing layer comprises materials selected from the group consisting of NiFe, CoFe, NiFeCr, NiFeX and CoFeX.

10. The magnetic storage of claim 8, further comprising lead layers formed on either side of the GMR sensor stack, wherein the lead layers comprises a layer of Rhodium disposed adjacent to the GMR sensor stack and a Tantalum layer formed over the layer of Rhodium.

11. The magnetic storage of claim 8, wherein the antiferromagnetic layer comprises a layer of Platinum-Manganese.

12. The magnetic storage of claim 8, wherein the in-stack biasing layer comprises a bias layer formed only over the spacer and a coupling layer formed over the bias layer and the antiferromagnetic layer.

13. The magnetic storage of claim 12, wherein the bias layer and the coupling layer each comprise a material selected from the group consisting of NiFe, CoFe, NiFeCr, NiFeX and CoFeX.

14. The magnetic storage of claim 8 further comprising a cap layer formed over the in-stack bias layer.

15. A method for providing a current-in-plane (CIP) GMR sensor with an improved in-stack bias layer with a thinner sensor stack, comprising;

forming a thin spin valve stack having a width selected to provide a predetermined track width;

forming a spacer over the spin valve stack, the spacer having a width substantially equal to the spin valve stack;

forming lead layers in a passive region outside the track;

forming, over the spacer, an in-stack bias layer having a width substantially equal to the width of the GMR sensor stack for biasing a free-layer of the spin valve stack;

forming a cap over the bias layer; and forming an antiferromagnetic layer on both sides of the in-stack biasing layer to provide an off-track bias layer.

16. The method of claim 15, wherein forming the lead layers further comprises forming a layer of Rhodium disposed adjacent to the GMR sensor stack and forming a Tantalum layer formed over the layer of Rhodium.

17. The method of claim 15, wherein the forming of the in-stack bias layer comprises forming a layer of Platinum-Manganese.

18. The method of claim 15, wherein the in-stack bias layer comprises a bias layer formed only over the spacer and a coupling layer formed over the bias layer and the antiferromagnetic layer.

19. The method of claim 18, wherein the forming of the bias layer and the coupling layer each further comprises using a material selected from the group consisting of NiFe, CoFe, NiFeCr, NiFeX and CoFeX.

* * * * *